US007769252B2

(12) United States Patent
Taverner et al.

(10) Patent No.: US 7,769,252 B2
(45) Date of Patent: Aug. 3, 2010

(54) LOCATION MARKER FOR DISTRIBUTED TEMPERATURE SENSING SYSTEMS

(75) Inventors: Domino Taverner, Farmington, CT (US); John J. Grunbeck, Northford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 12/028,401

(22) Filed: Feb. 8, 2008

(65) Prior Publication Data

US 2009/0202192 A1 Aug. 13, 2009

(51) Int. Cl.
*G02B 6/00* (2006.01)
(52) U.S. Cl. .............................. 385/12; 385/13; 385/37; 356/73.1; 356/477
(58) Field of Classification Search .................. None
See application file for complete search history.

(56) References Cited

U.S. PATENT DOCUMENTS

| 6,807,324 | B2 | 10/2004 | Pruett |
| 6,928,202 | B2 * | 8/2005 | Pickrell et al. ................. 385/12 |
| 7,126,680 | B2 * | 10/2006 | Yamate et al. ............. 356/73.1 |
| 2003/0094281 | A1 * | 5/2003 | Tubel .................... 166/250.03 |
| 2005/0263281 | A1 * | 12/2005 | Lovell et al. ............. 166/255.1 |
| 2006/0209291 | A1 | 9/2006 | Yamate et al. |
| 2007/0165691 | A1 | 7/2007 | Taverner et al. |
| 2007/0223556 | A1 * | 9/2007 | Lee et al. ........................ 374/1 |

FOREIGN PATENT DOCUMENTS

| EP | 2 063 245 | | 5/2009 |
| GB | 2 446 285 | | 8/2008 |
| WO | WO 03/098176 | | 11/2003 |
| WO | WO 2006/010959 | * | 2/2006 |
| WO | WO 2006/027369 | | 3/2006 |
| WO | WO 2007/121014 | | 10/2007 |

OTHER PUBLICATIONS

GB Search Report, Application No. GB0902099.1, dated Jun. 10, 2009.

* cited by examiner

*Primary Examiner*—Uyen-Chau N Le
*Assistant Examiner*—Chad H Smith
(74) *Attorney, Agent, or Firm*—Patterson & Sheridan, LLP

(57) ABSTRACT

Methods and apparatus for distributed temperature sensing (DTS) include marking one or more points at known locations along a waveguide or fiber of a distributed temperature sensing (DTS) system and applying position information from such marked locations to DTS measurements. A Bragg grating in the waveguide or fiber may provide a discrete marker for identification of the position information. Application of the position information from such marked locations to the DTS measurements avoids ambiguous interpretations of other inherent features to assess location and enables data analysis referenced by the known locations to correlate the DTS measurements in space.

22 Claims, 3 Drawing Sheets

LOCATION MARKER FOR DISTRIBUTED TEMPERATURE SENSING SYSTEMS

BACKGROUND OF THE INVENTION

1. Field of the Invention

Embodiments of the invention generally relate to distributed temperature sensing.

2. Description of the Related Art

Distributed Temperature Sensing (DTS) enables monitoring temperature along the length of a well bore, for example. DTS employs an optical fiber installed along the length of a well to function as both a communication line and a temperature sensor. A laser or other light source at the surface of the well transmits a pulse of light into the fiber. As the light propagates through the fiber, scattering reflects some of the light back towards the surface for detection. In Raman scattering, incident light is scattered by optical phonons and undergoes relatively large frequency shifts. In Brillouin scattering, incident light is scattered by acoustic vibrations (phonons) and undergoes relatively small frequency shifts. The frequency or intensity of these reflections relative to the pulsed light shift in accordance with the temperature of the atoms along the fiber. Accordingly, processing of this reflected light as a function of time can derive temperature as a function of well depth, with earlier reflections indicating the temperature at shallow depths, and later reflections indicating the temperature at relatively deeper depths.

However, assessment of the depths based on time of travel of the light relies on various assumptions that can vary from fiber to fiber and create uncertainty as to locations of the temperatures measured. The assumptions result in potential significant error making reliable accurate determinations of where points of a temperature profile from the DTS correspond difficult. Application specific requirements and conditions like cable design, deployment methods and inaccessibility of the fiber further complicate relating actual physical location of a given point along the installation to distance in a DTS measurement.

For example, assumptions may relate to refractive index of the fiber and/or overstuff of the fiber within a cable or other system component. Distance computations based on the time of flight for the light depend on the refractive index of the fiber through which the light propagates. Utilizing an average refractive index associated in general with material properties of the fiber fails to account for real variances in the refractive index that may occur at different positions along the fiber, particularly if different lots of fiber are used in different cable sections, or any changes in the refractive index over time. Further, unknowns regarding amount of an excess length of the fiber within a relatively shorter length of the cable necessitate estimation to correlate between computed distances along the fiber and the length of the cable.

Therefore, there exists a need for improved systems and methods of distributed temperature sensing.

SUMMARY OF THE INVENTION

A system in one embodiment relates to distributed temperature sensing (DTS). The system includes at least one DTS optical fiber and instrumentation coupled to the at least one DTS optical fiber. The instrumentation performs DTS signal processing and calibrates data from the DTS signal processing with respect to position based on a reflection signal from a marker disposed along the fiber.

A method of DTS according to one embodiment includes receiving temperature data from a DTS optical fiber. The method further includes receiving position information from a marker disposed along the DTS optical fiber. Applying the position information to the temperature data produces a temperature profile calibrated based on the position information.

For one embodiment, a system for DTS includes a DTS processor having circuitry to analyze optical scattered light signals to make distributed temperature measurements. A location marker processor of the system includes calibration logic that determines a spatial correction that is input to the DTS processor. The calibration logic compensates reflected optical signals from a grating based on a known location of the grating to produce the spatial correction implemented by the DTS processor to provide adjusted data indicative of the temperature measurements as a function of locations compensated with the spatial correction. In addition, an output couples to the DTS processor to convey the adjusted data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention relate to marking one or more points at known locations along a waveguide or fiber of a distributed temperature sensing (DTS) system and applying information from such marked locations to DTS measurements. For some embodiments, a Bragg grating in the waveguide or fiber provides a discrete marker for identification of the information. Application of the information from such marked locations to the DTS measurements avoids ambiguous interpretations of other inherent features to assess location and enables data analysis referenced by the known locations to correlate the DTS measurements in space.

Figure 1:
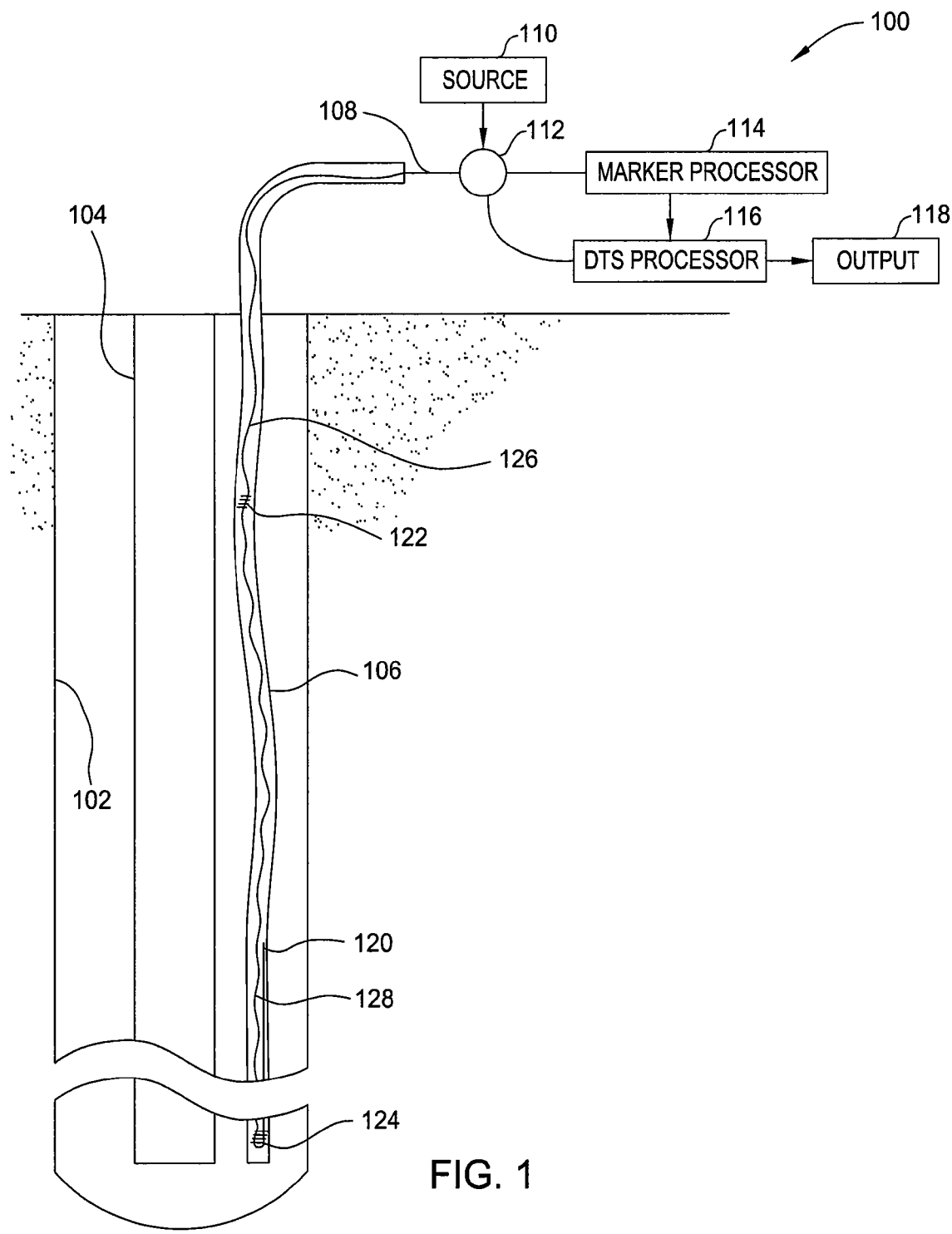
FIG. 1 schematically shows a distributed temperature sensing (DTS) system with spatial calibration, according to one embodiment of the invention.

FIG. 1 schematically shows a DTS system 100 with spatial calibration using a marker processor 114 in combination with a DTS processor 116. The DTS system 100 includes a light source 110 optically connected by a coupler 112 to at least one optical waveguide, such as an optical fiber 108, within a cable 106 disposed in a cased well 102. The light source 110 in some embodiments includes one or more lasers since both processors 114, 116 may share a common laser and/or waveguide or operate with separate lasers and/or waveguides. The coupler 112 further optically connects receiver/detection equipment of the DTS processor 116 and the marker processor 114 to the optical fiber 108 regardless of whether the receiver/detection equipment of the DTS processor 116 and the marker processor 114 is shared or unique to each of the processors 114, 116. In operation, light from the source 110 propagates through the fiber 108 with a portion of the light being scattered back to the DTS processor 114 and reflected back to the marker processor 116 for analysis as described further herein.

For some embodiments, the cable 106 clamps to an outer circumference of production tubing 104 run into the cased well 102. This exemplary position and routing of the cable 106 represents only one of various applications utilizing the DTS system 100. For example, the cable 106 may be deployed outside casing, along well screen, within walls of the production tubing 104, or in any other settings or industries where such temperature sensing is desired. The cable 106 contains the optical fiber 108, which may be overstuffed within the cable 106, as shown by non-uniform gathering of the fiber 108 that thereby has a greater straightened length per unit distance along a sensing direction than the cable 106 itself.

For some embodiments, the fiber 108 loops back to provide parallel sections of the fiber 108 alongside one another. For example, a terminal end 120 of the fiber 108 may be disposed in a partial loop-back deployment toward the DTS processor 116 relative to doubled up regions of the fiber 108 upon the fiber 108 turning around at an end of where temperature sensing occurs with the DTS system 100. Double ended deployment, in some embodiments, refers to applications where the terminal end 120 extends back and connects to the DTS processor 116 for DTS analysis.

The fiber 108 includes a first Bragg grating 122 at a first known position along the cable 106 and a second Bragg grating 124 at a known turn-around of the fiber 108. While two of the gratings 122, 124 are illustrated at exemplary positions, the system 100 may have only one or additional reflectors such as the gratings 122, 124 at any known position to achieve the spatial calibration. Providing discrete reflectors like the gratings 122, 124 in order to mark locations offers detectable signals without creating unnecessary transmission loss as compared to connectors, for example, which can produce large and unstable losses.

In operation, the Bragg gratings 122, 124 reflect a response signal for analysis by the marker processor 114. For some embodiments, the marker processor 114 performs optical time-domain reflectometry (OTDR) in analyzing the signal from the Bragg gratings 122,124. Since actual physical locations of the Bragg gratings 122, 124 along the cable 106 are known, measured values for positions of the gratings 122, 124 obtained with the OTDR enables stretching or compressing of the measured values to the actual physical locations. In some embodiments, an amount required for the stretching or compressing can be applied as a correction coefficient to DTS plots of temperature as a function of assessed fiber length without calibration so that the DTS plots with the correction applied correspond to locations along the cable 106.

Various approaches exist for applying a spatial correction determined with the marker processor 114 to a temperature profile determined with the DTS processor 116. For example, the correction coefficient application offers one approach for calibrating the temperature profile. The marker processor 114, for some embodiments, evaluates the signal from the Bragg gratings 122, 124 with respect to the actual physical locations to give input values such as calculated average index of refraction and amount of overstuff, if present. The input values may then feedback to the DTS processor 116 for use during DTS analysis in order to produce initial corrected temperature plots that are thereby already compensated to locations along the cable 106 and that may be made in real time.

Applying the correction to subsequent data generated using the DTS processor 116 thereby calibrates the subsequent data without requiring ongoing and parallel processing with the marker processor 114. Wavelength of the signal from the Bragg gratings 122, 124 may include at least one of a pump, Stokes or anti-Stokes bands of the DTS system 100. The OTDR done by the marker processor 114 can occur with a separate measurement than associated with the DTS processor 116 or utilize DTS Stokes and anti-Stokes measurements that the DTS processor 116 assesses for temperature determinations. For some embodiments, the Bragg gratings 122, 124 may produce the signal that is out-of-band relative to a wavelength range utilized by the DTS processor 116 so long as appropriate wavelength adjustments are taken into account. Another instrument, for example, operating at a different wavelength than the DTS processor 116 may establish the correction since once the correction or relationship is known repeat processing is not necessary.

In some embodiments, the first grating 122 produces the signal with a wavelength in the Stokes band while the second grating 124 produces the signal with a wavelength in the anti-Stokes band. Time of travel for the light tends to vary not only from fiber to fiber but also between the bands. The difference in the first and second gratings 122, 124 enables accounting for uncertainty as a result of refractive index differences between the Stokes and anti-Stokes band wavelengths. In such an embodiment having the first grating 122 and second grating 124 at the same spatial location within the fiber simplifies the calculation.

For some embodiments, an attribute of the DTS system 100 such as the turnaround point where the second Bragg grating 124 is disposed represents all that is identified such that actual physical location may not be known. This attribute identification still facilitates data analysis performed by the DTS processor 116, such as comparison of data that should be the same at corresponding positions on each side of the turnaround point. For example, proper identification of the turnaround point enables differentiation between two measurements derived respectively from light propagating in opposite directions depending on position along the fiber 108 relative to the turnaround point.

In some embodiments, the DTS system 100 further includes an output 118 of the temperature measurements obtained with the DTS processor 116 and calibrated with respect to physical locations of the measurements. The output 118 may communicate the temperature measurements to a user via a video screen or a printout, generate a signal based on the temperature measurements, or control a device based on the temperature measurements. The output 118 conveys the temperature measurements as either a full temperature profile along calibrated locations for all of the fiber 108 or temperature values at any number of discrete calibrated locations within the profile.

By way of example, a first point 126 represents where temperature is measured using the DTS processor 116. However, actual location of the first point 126 may remain unknown without reference and calibration as set forth herein since any measured location along the fiber 108 with the DTS processor 116 alone does not account for potential variables, such as overstuff of the fiber 108 in the cable 106 and/or discrepancy in the refractive index of the fiber 108 from an estimated value of the refractive index used in establishing temperature as an approximated function of fiber length. Further, a second point 128 identifies where temperature is measured at corresponding lengths of the fiber 108 on either side of the turnaround point. Knowing the turnaround point with use of the second Bragg grating 124 aides in aligning data that is obtained from both the corresponding lengths of the fiber 108 for the second point 128.

Figure 2:
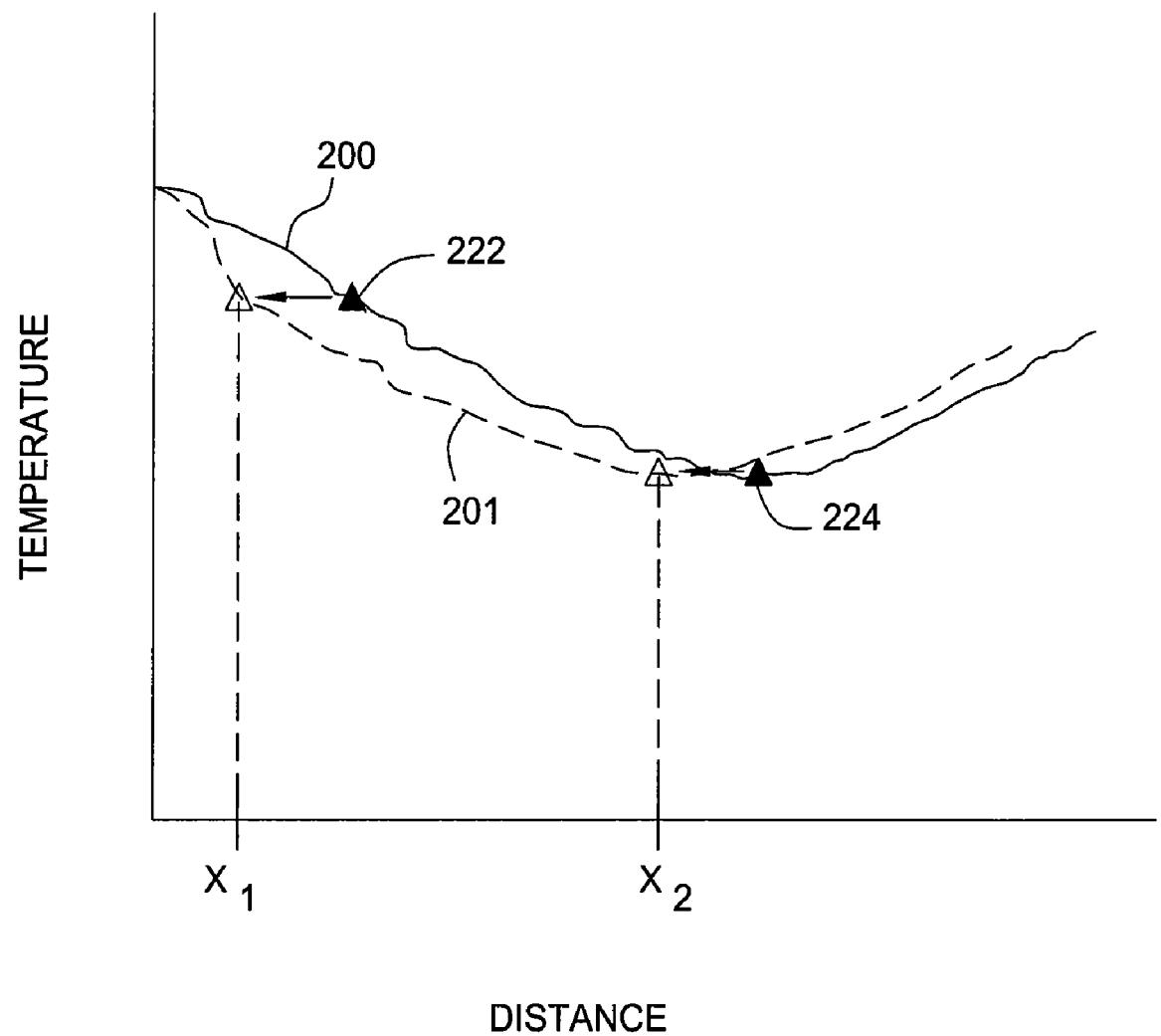
FIG. 2 illustrates a temperature versus distance plot graphically showing correction required for the spatial calibration using two markers at known distances/attributes, according to one embodiment of the invention.

FIG. 2 illustrates a temperature versus distance plot graphically showing correction required for the spatial calibration using markers such as the Bragg gratings 122, 124. First and second reflections identified by respective solid triangles 222, 224 received from the markers correspond to locations on an uncorrected profile 200 and identify actual distances where the markers are disposed. Shifting of the uncorrected profile 200 to a corrected profile 201 occurs based on calibration of the locations on the uncorrected profile 200 where the solid triangles 222, 224 are to the actual distances.

Figure 3:
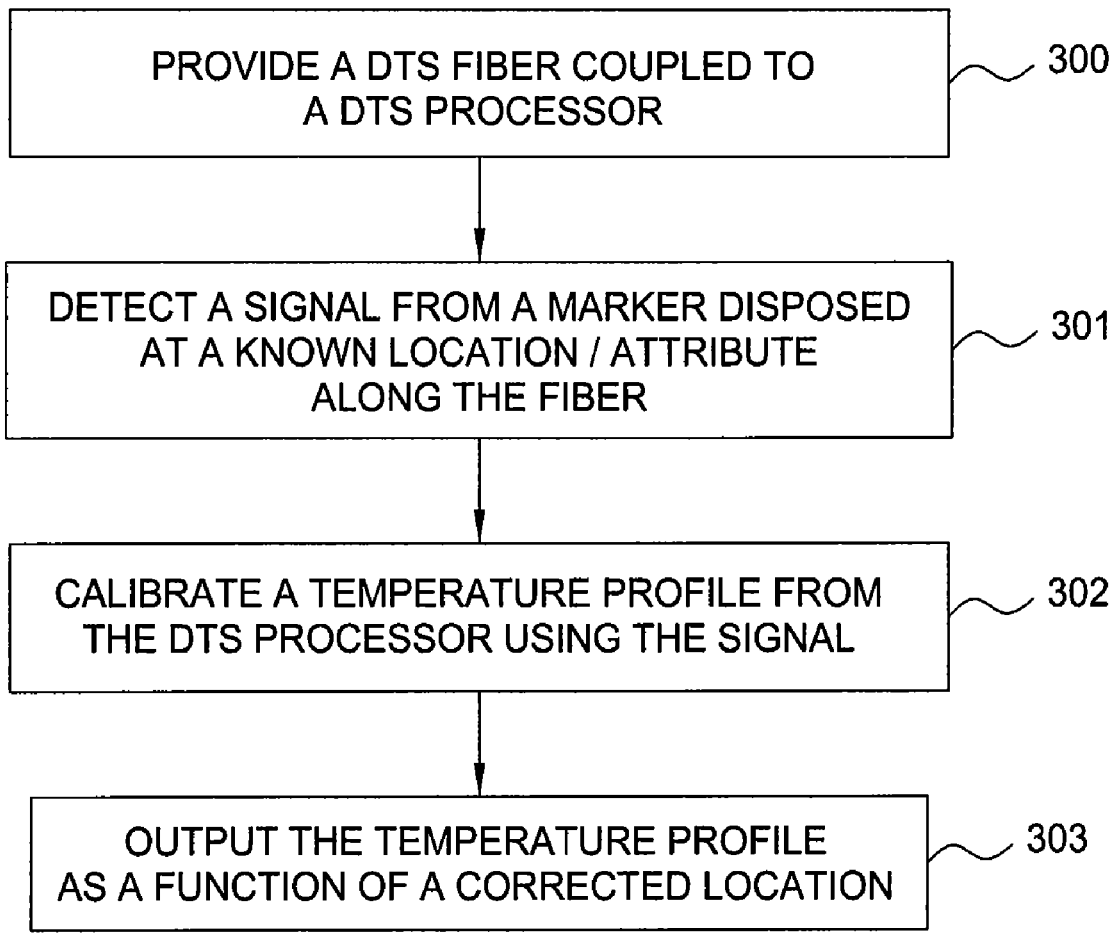
FIG. 3 depicts a flow chart for a method of measuring temperature sensed with a DTS system, according to one embodiment of the invention.

FIG. 3 depicts a flow chart for a method of measuring temperature sensed with a DTS system such as the system 100 shown in FIG. 1. Setup step 300 includes providing a DTS fiber coupled to a DTS processor configured to evaluate scattered light signals, such as intensity of Raman scattering, in order to determine temperatures along the DTS fiber. At detection step 301, receiving a signal from a marker, such as a reflective grating, disposed at a known location and/or attribute along the fiber occurs. Calibrating a temperature profile from the DTS processor in correction step 302 adjusts position information within the temperature profile. The temperature profile after being calibrated in the correction step 302 outputs, via a transmission step 303, measured temperatures as a function of a corrected location, for example.

While the foregoing is directed to embodiments of the present invention, other and further embodiments of the invention may be devised without departing from the basic scope thereof, and the scope thereof is determined by the claims that follow.

What is claimed is:

1. A system for distributed temperature sensing (DTS), comprising:
    at least one optical fiber, and
    instrumentation coupled to the at least one optical fiber, wherein the instrumentation is configured to perform DTS signal processing, determining a spatial correction coefficient based on a reflection signal from a grating disposed along the fiber, and use the spatial correction coefficient to compensate positions of a DTS profile generated from the DTS signal processing.

2. The system of claim 1, wherein the marker is disposed at a known physical location.

3. The system of claim 1, wherein the marker is disposed at a turnaround of the optical fiber.

4. The system of claim 1, wherein the marker comprises a Bragg grating.

5. The system of claim 1, wherein the marker includes at least one grating having a wavelength of reflection in at least one of pump, Stokes and anti-Stokes bands of the system.

6. The system of claim 1, wherein the marker includes at least two gratings located together and having respective wavelengths of reflection each in a different one of pump, Stokes and anti-Stokes bands of the system.

7. The system of claim 1, wherein the marker includes first and second gratings having wavelengths of reflection respectively in Stokes and anti-Stokes bands of the system.

8. The system of claim 1, further comprising a cable that the optical fiber is disposed in, wherein the fiber in the cable is longer than the cable.

9. The system of claim 1, further comprising an output coupled to the instrumentation to receive and display the data as calibrated.

10. The system of claim 1, wherein the marker includes multiple gratings separated from one another along the optical fiber.

11. A method of distributed temperature sensing (DTS), comprising:
    receiving temperature data from an optical fiber, said optical fiber being disposed in a cable;
    determining position information based on a reflection signal from a grating disposed along the optical fiber; and
    applying the position information to the temperature data to produce a temperature profile along the cable calibrated based on the position information.

12. The method of claim 11, further comprising adjusting subsequent DTS profiles using a correction determined in applying the position information to the temperature data.

13. The method of claim 11, further comprising displaying the temperature profile.

14. The method of claim 11, further comprising running the optical fiber into a well bore such that the profiles obtained correspond to a length of a cable carrying the optical fiber.

15. The method of claim 11, further comprising determining a physical location of the marker prior to receiving the position information.

16. The method of claim 11, further comprising correcting the position information against a known physical location of the marker with respect to the cable.

17. The method of claim 11, wherein applying the position information to the temperature data includes compensating reflected optical signals from the marker based on a known location of the marker to produce a spatial correction implemented to provide the temperature profile with positions compensated with the spatial correction.

18. The method of claim 11, further comprising disposing the marker at a turnaround of the optical fiber.

19. The method of claim 11, further comprising providing a Bragg grating to form the marker.

20. A system for distributed temperature sensing (DTS), comprising:
    a DTS processor having circuitry to analyze optical scattered light signals to make distributed temperature measurements;
    a location marker processor having calibration logic that determines a spatial correction input to the DTS processor, wherein the calibration logic compensates reflected optical signals from a grating based on a known location of the grating to produce the spatial correction implemented by the DTS processor to provide adjusted data indicative of the temperature measurements as a function of locations compensated with the spatial correction; and
    an output coupled to the DTS processor to convey the adjusted data.

21. The system of claim 20, wherein the output comprises a display.

22. The system of claim 20, further comprising an optical waveguide, wherein the optical waveguide couples to the processors and has the grating written therein.

* * * * *